June 20, 1961 L. E. LEE 2,989,078
THREAD COUNTER DIAL VALVE
Original Filed March 29, 1957 3 Sheets-Sheet 3
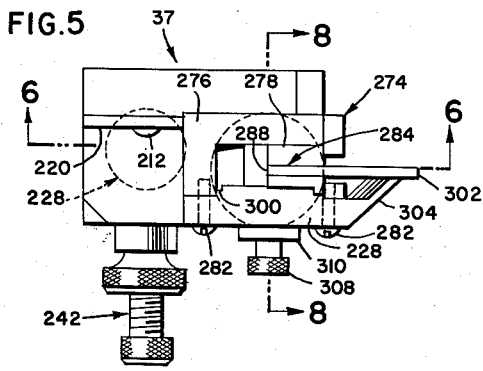
FIG. 5
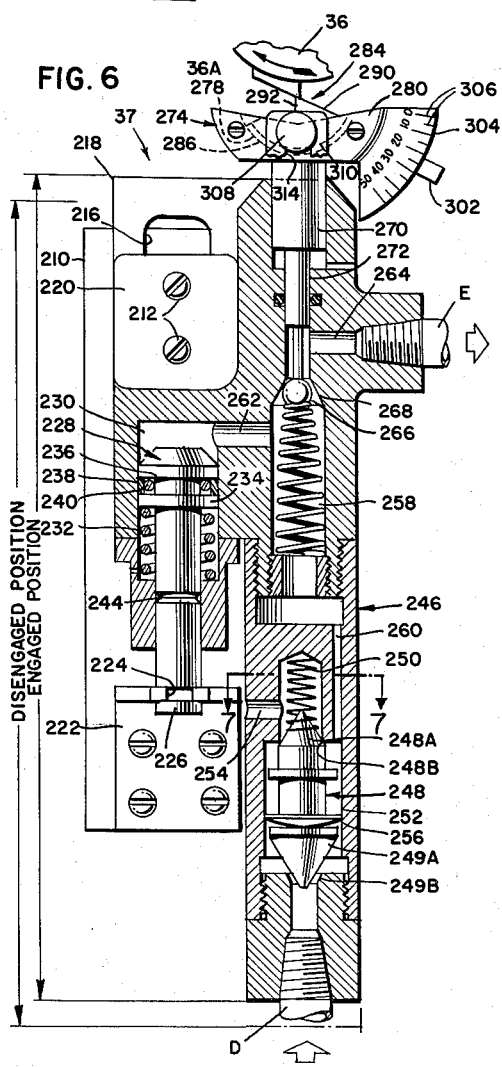
FIG. 6
AIR FROM PRESSURE
RESPONSE VALVE 29
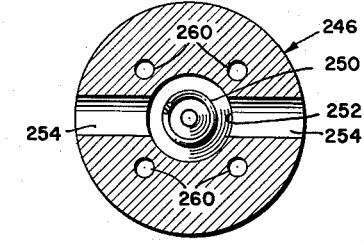
FIG. 7
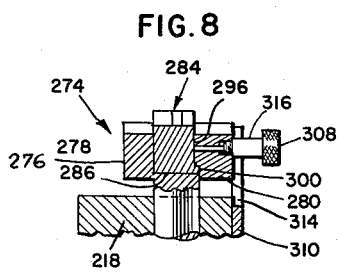
FIG. 8
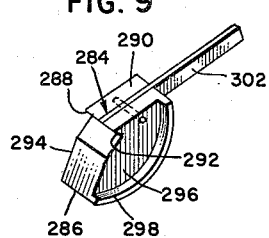
FIG. 9
INVENTOR
LUTHER E. LEE
BY Claude Funkhouser
ATTORNEY

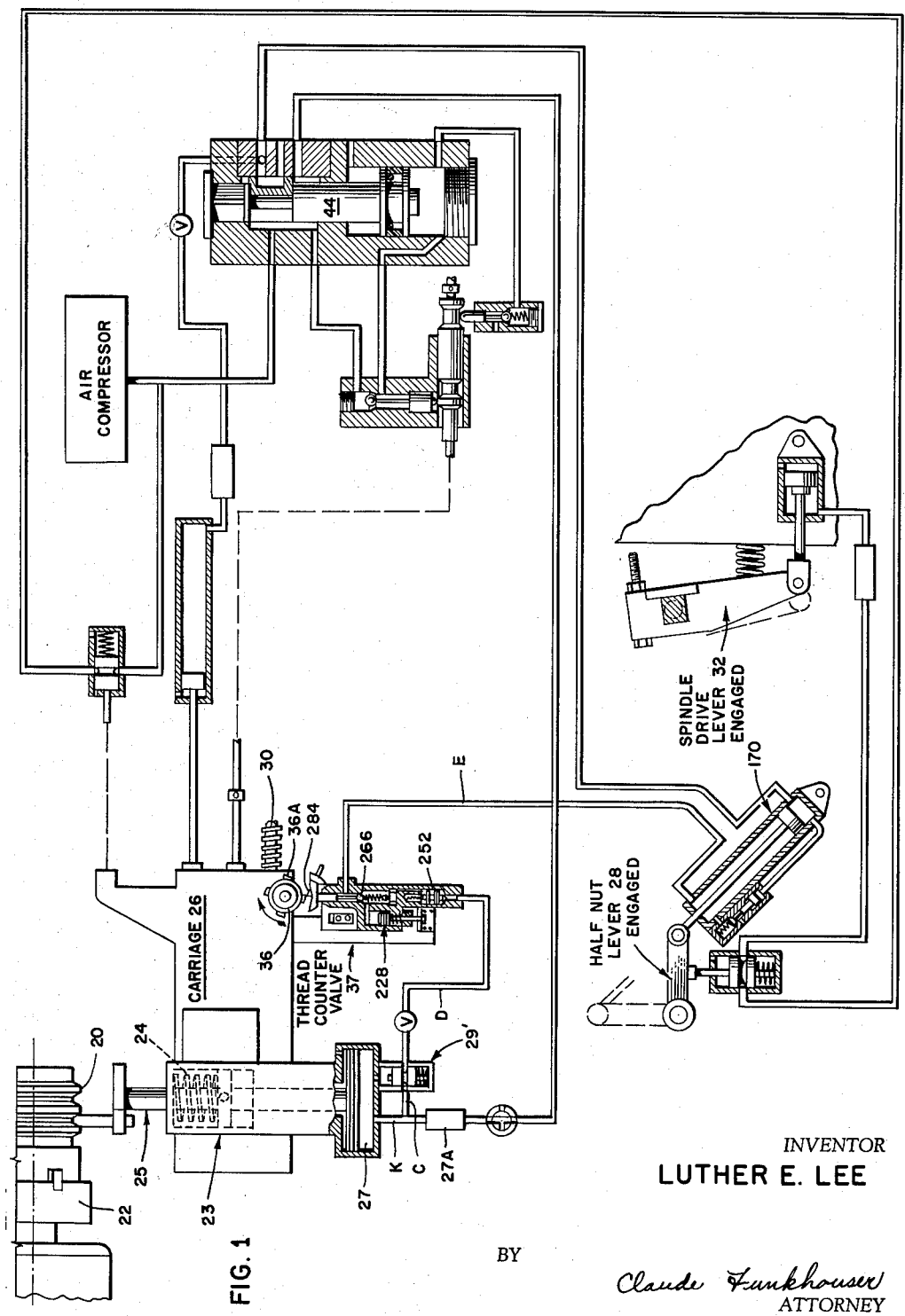

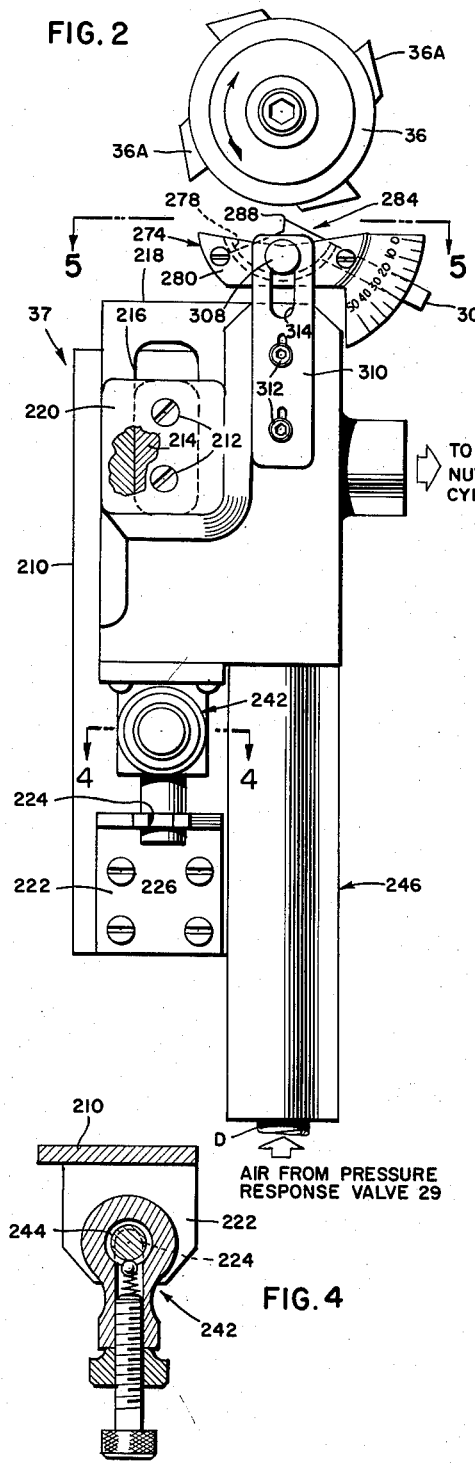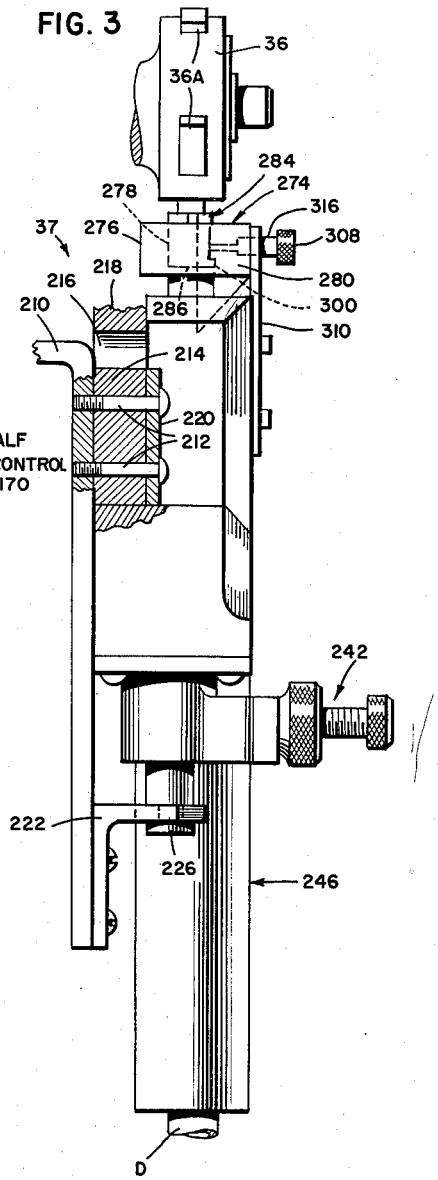

United States Patent Office 2,989,078
Patented June 20, 1961

2,989,078
THREAD COUNTER DIAL VALVE
Luther E. Lee, 6625 Eastern Ave., Takoma Park, Md.
Original application Mar. 29, 1957, Ser. No. 649,580, now Patent No. 2,897,790, dated Aug. 4, 1959. Divided and this application Mar. 26, 1959, Ser. No. 802,269
8 Claims. (Cl. 137—620)
(Granted under Title 35, U.S. Code (1952), sec. 266)

The invention described herein may be manufactured and used by or for the Government of the United States of America for governmental purposes without the payment of any royalties thereon or therefor.

The instant invention is a division of United States Patent No. 2,897,790, filed March 29, 1957, for Control System.

The present invention relates to a valve assembly and more particularly to a thread counter valve for use with apparatus of the afore-mentioned Patent No. 2,897,790. More specifically the invention relates to a thread counter valve which functions automatically and selectively to engage and disengage the rotating counter dial of a conventional machine tool such, for example, as a high speed engine lathe during thread cutting operations.

An object of the present invention is to provide a new and improved pressure response valve assembly suitable for use with a lathe.

Another object of the invention is the provision of a counter valve assembly wherein pressure actuated means selectively engage a rotating thread counter dial of a lathe to initiate a series of operations responsive to a predetermined pressure exerted on the feed of the lathe cutting tool.

A further object of the invention is the provision of a counter valve having adjustable cam means for engaging a rotating thread counter dial of a lathe in variable degrees of timed relationship in accordance with selected speeds of the lathe.

Still another object of the invention is the provision of a counter valve assembly having angularly adjustable cam means for selectively engaging and disengaging complementary cam means on the rotating thread counter dial of a machine tool during a thread cutting operation.

Other objects and many of the attendant advantages of this invention will be readily appreciated as the same becomes better understood by reference to the following detailed description when considered in connection with the accompanying drawings wherein:

FIG. 1 is a diagrammatic view illustrating the thread counter valve of the present embodiment in connection with a machine tool fluid control system;

FIG. 2 is a side elevational view of the thread counter valve in connection with a thread dial indicator, illustrating the valve in a raised cam engaging position;

FIG. 3 is an end elevational view of the valve and dial of FIG. 2, partially in elevation and partially in section;

FIG. 4 is a transverse sectional view taken substantially on the line 4—4 of FIG. 2;

FIG. 5 is a top plan view of the counter valve as viewed from a line substantially corresponding to the line 5—5 of FIG. 2;

FIG. 6 is a longitudinal sectional view taken substantially on the line 6—6 of FIG. 5;

FIG. 7 is a transverse sectional view taken substantially on the line 7—7 of FIG. 6;

FIG. 8 is a fragmentary sectional view taken substantially on the line 8—8 of FIG. 5; and FIG. 9 is a perspective view of the variable cam removed from the valve.

Referring to the drawings and more particularly to FIG. 1 thereof, the thread counter valve of the present invention and generally indicated by the numeral 37 is illustrated as being connected in a fluid control system suitable for use in a conventional engine lathe, components of which are diagrammatically shown, such, for example, as the type employed in turning and thread cutting operations. The lathe mounts a rotatable workpiece 20 supported at one end in a head stock 22, the opposite end being supported in any conventional manner. An automatic step advancing toolholder 23, such as disclosed in my United States Patent No. 2,889,754 filed March 1, 1954, for Machine Tool, is secured to the conventional cross-feed slide (not shown) for preliminary positioning of the toolholder with relation to the workpiece. A carriage 26 supports the toolholder 23 for longitudinal forward and rearward movement, the carriage 26 being driven forwardly during thread cutting operations by engagement of half-nut lever 28 coacting with a lead screw 30. Other conventional lathe elements include a clutch for the spindle drive, operable by a spindle drive lever 32, and a thread counter dial 36 which rotates at a speed indicative of the lead screw rotation and having a plurality of mutually spaced cams 36A mounted thereon which cooperate with a single cam carried by a vertically movable counter valve constructed in accordance with the present invention during a thread cutting operation.

FIGS. 2 through 9 pertain to detailed illustrations of the dial operated thread counter valve 37 of the present invention, employed with the afore-mentioned fluid control system patent No. 2,897,790. Heretofore, in normal thread cutting operations of a lathe not employing the valve 37 of the present invention, it was necessary for the operator to view the conventional rotating thread counter dial, generally having indicia about the outer peripheral surface thereof, and at the instant of registration of one of the selected indicia with a fixed mark or reference point, the operator would manually engage the half-nut lever 28. While this method of operation is suitable for low speed operations on large diameter stock such, for example, as up to and including two threads per inch and at a cutting speed of 75 revolutions per minute. However, on high speed work or when the cutting speed is increased considerably in the order of two threads per inch and 500 or more revolutions per minute, manual engagement of the half-nut lever is practically impossible. The present valve 37 overcomes the aforesaid disadvantages by being automatically and selectively positioned for engagement or disengagement with a rotating thread counter dial and further provides means for varying the angle of the cam on the valve which cooperates with complementary cams on the rotating counter dial.

As more clearly shown on FIGS. 2, 3 and 6, the valve 37 may be secured to a bracket 210 fixed to the lathe by bolts or the like 212 passing through a supporting block 214. The block 214 is disposed within a slot 216 formed in the body or casing of the valve 37 and retained against lateral movement by retainer plate 220, the plate being secured to block 214 by the aforesaid bolts 212. By this arrangement and in response to pressure in chamber 230 formed in casing 218, the casing is adapted to be moved vertically on block 214, such operation being more fully set forth hereinafter. An angular bracket 222 secured to the lower end of the bracket 210 is provided with a slot 224 which receives and retains a grooved lower end of a stem 226 of a lifter piston 228, FIGS. 2, 3 and 6. By the spring arrangement 232 in engagement with piston head 234 in chamber 230, the valve body 218 is normally biased in a downward direction whereupon cam 284 on cam housing 274 is maintained out of engagement with cams 36A on the thread counter dial 36. When valve casing or body 218 is moved to an operating position, FIG. 6, cam 284 is moved to a position to be selectively engaged by cams 36A on dial 36 and spring 232 in chamber 230 is compressed between the bottom wall of chamber 230 and head 234 in response to movement of casing 218 with respect to piston 228 thereby to insure return of the casing from an operating position to an initial position when pressure in chamber 230 of counter valve 37 is reduced, as will be hereinafter more fully described. Suitable sealing means for the piston head 234 are provided by a sealing ring 238 disposed in a circumferential groove 236 formed in the head, the ring 238 being composed of any material suitable for the purpose such, for example, as "Teflon" and combined with an O-ring 240 urging the ring outwardly to engage the walls of piston chamber 230.

In order to insure positive lock-in at the upper limit of the desired valve travel an adjustable spring biased detent 242, FIG. 4, is provided for engagement with a V-shaped groove 244 formed in the stem 226 of piston 228. Sufficient pressure may be applied on piston 228 by detent 242 to cause resistance to the movement of casing 218, as the casing is moved with respect to piston 228 and thus providing an adjustment whereby body or casing 218 may be operated in response to an increase or decrease in the operating pressure. For example, if the toolholder 23 is operable at pressures of 60 to 80 pounds per square inch and speed of operation of the lathe is too great to permit lock-in at these available pressures, increasing the spring pressure of detent 242 will require the pressure buildup to be in the order of substantially 100 pounds per square inch.

As best shown on FIGS. 2 and 6, the counter or thread dial indicator 36 is provided with a plurality of cam elements 36A secured thereto in any suitable manner for engagement with a variable cam 284 to operate a check valve 268 therein at predetermined time intervals. In order to synchronize the engagement of the half-nut lever 28 upon the engagement of a cam 36A with the variable cam 284 during rotation of thread counter dial 36, the thread counter valve 37 is caused to be moved into operating or cam engaging position as the pressure in chamber 230 of counter valve 37 reaches a predetermined value, whereupon the aforesaid cam 284 selectively engages the cams 36A as the dial 36 rotates. It will be understood that as fluid under pressure enters cylinder 252 by way of conduit D from a suitable pressure source, pressurized fluid is supplied to chamber 230 of counter valve 37 by way of valve 248 which is now in a condition to pass pressure thereby, and thence by way of chamber 252, and ports 260 and 262. When the pressure in chamber 230 reaches a predetermined value, valve casing 218 is moved to the aforesaid operating position, the casing being moved slidably on the head 234 of piston 228 and the block 214. The casing or body 218 is maintained in an initial position by spring 232 disposed within chamber 230, the spring being adapted to urge the casing from an operating position to an initial position when the pressure in chamber 230 is reduced. Upon engagement of cams 284 and 36A check valve 266 is opened by stem 272 on cam housing 274, whereupon fluid pressure passes through passage 264 and conduit E to one side of a half-nut lever operating cylinder 170 to operate the half-nut lever 28. At this stage of the cycle, the rotating thread counter dial 36 automatically stops and check valve 266 remains open for the remainder of the thread cutting operation.

Mounted parallel to but axially displaced from the lifter piston 228 is an elongated valve 246, FIG. 6, bored and threaded at its lower inlet end to receive conduit D. A floating check valve 248, spring biased by spring 250 in a downward direction, is vertically movable in a valve cylinder or chamber 252 formed in the lower end of casing 218. Check valve 248 is cylindrical in shape, the upper and lower ends thereof being conical or truncated as at 248A and 249A, respectively, for engagement with upper and lower valve seats 248B and 249B, respectively. The lower valve seat 249B seals off conduit D when the check valve is in the down position while the upper valve seat 248A seals pressure air from a series of lateral vents 254 in communication with the atmosphere, when the check valve is in the up position, i.e., with the pressure flowing from chamber 27 by way of response valve 29' and conduit D. The major portion of the check valve 248 is of smaller diameter than the valve cylinder 252 but is rendered airtight by the provision of a relatively thin, annular skirt 256, formed integrally therewith and engageable with the walls of the valve cylinder 252. The check valve 248 in chamber 252 is made preferably of Teflon, this material being sufficiently pliable to allow the integral skirt 256 to pass incoming air from the response valve 29' in an upward direction but effectively sealing the cylinder walls against return reverse pressure during venting of the valve 37.

An intermediate chamber 258 communicates with the lower check valve chamber 252 via a series of vertically aligned passage 260, FIG. 7, and also with the lifter piston cylinder 230 via lateral passage 262. The upper portion of the intermediate chamber 258 communicates with conduit E via lateral passage 264 and is normally sealed off therefrom by means of a spring biased ball check 266 bearing against valve seat 268. The uppermost portion of the valve casing or body 218 supports a reciprocable plunger 270, the lower end of which is reduced in diameter to form a stem 272 engageable with the ball check 266 when the casing is in the aforesaid operating position to maintain the ball check out of engagement with seat 268. The spring in chamber 258 moves the ball check in sealing engagement with seat 268 when the casing 218 has been moved from an operating position to an initial position while the upper end of the plunger carries an integrally formed cam housing 274.

It will be understood that upon reverse movement of a selector valve piston 44, ram piston chamber 27 is vented by way of vent valve 27A and concurrently therewith the pressure in chamber 252 of valve 37 is initially reduced by way of conduits D and K, pressure valve 29' and vent valve 27A, the pressure valve 29' being constructed and arranged to remain in the position shown in FIG. 1 until the valve chamber 252 is fully vented by port 254. When this occurs ram 25 is returned to an initial position by return spring 24, FIG. 1, valve 248 in chamber 252 of counter valve 37 is moved into engagement with seat 249B by spring 250 and out of engagement with seat 248B thereby allowing pressure within chamber 230 of valve 37 to be vented by way of ports 262, chamber 258, passages 260 and 254 to atmosphere, as best shown on FIG. 6. As the pressure in chamber 230 is vented in the aforesaid manner, the valve casing 218 will return from an operating position, FIG. 6, to an initial position by spring 232, with cam 284 out of the path of travel of cams 36A and with ball check 266 in sealing engagement with seat 268, the valve 266 being maintained in engagement with seat 268 by the spring in chamber 258.

Referring now to FIGS. 3, 5 and 8, the cam housing 274, shown to be rectangular in plan form, is composed of a cam support block 276 radially groved as at 278 and a cam retainer plate 280 secured to the support block 276 in any suitable manner, such as by bolts 282. The variable actuator cam 284 has a lower face 286 formed on a radius from its cam point 288 to matingly engage the radial groove 278 of support block 276 while the upper face is formed as a cam having an inclined face 290 rising on one side to the point 288 with fast drop in angle by vertical face 292 on the opposite side. One side 294 of the came 284 is smooth walled while the opposite side 296 has a relatively small radial shoulder 298 which, when assembled in the cam housing, mates with a similar groove 300 formed in the retainer plate 280. From the foregoing construction, it is readily apparent that the cam 284 is free to move within the cam housing 274 in a radial manner about its point 288 but is retained against any vertical displacement by means of the radial shoulder 298 being engaged by the groove 300 in the retainer plate 280. To facilitate desired angular changes of the cam 284, an operating lever 302 is provided, the lever forming the central part of cam 284 and extending from the cam a sufficient distance beyond an indicator arc 304 carried by the retainer plate 280 to enable facility of movement by an operator. Suitable indicia 306 on the indicator arc 304 enable accurate positionings of the cam 284 by the lever 302. A lock bolt 308, FIG. 8, is threaded into the retainer plate 280 and frictionally engages wall 296 of the cam thus locking the cam 284 at the desired angular relationship. It is to be noted that the point 288 of cam 284 will always be in the same relative position with respect to lobes 36A formed on the thread counter dial 36 but that the inclined face 290 can be presented in earlier or later timed striking relationship with lobes 36A. For example, moving the lever 302 counterclockwise will raise the inclined face 290 to produce earlier cam reaction while moving the lever 302 in the reverse direction will ultimately present only a fraction of the surface of the cam 284 adjacent the point 288 thus producing later cam reaction. Assuming the lathe to be operating at 100 revolutions per minute and cutting two threads per inch, the lever 302 would be moved to the position shown in FIG. 2, that is on the "20" mark. However, if the speed of lathe operation is increased to 500 revolutions per minute, the lever 302 would be moved to the "0" mark. If the cam were not made variable, it is apparent that the small surface area presented by the point 288 of the cam 284 could possibly strike a rotating thread counter cam lobe 36A for a fleeting instant with insufficient time for the flow of air pressure to cause full engagement of the half-nut, and the dial would rotate past the mark and stop rotating in late timed relationship. In other words, the half-nut lever cylinder 170 would partially engage the half-nut lever 28 in improper synchronization, i.e., engage the angular sides of the lead screw causing crossed threads or spoilage of the work.

Vertical movement of the cam housing 274 is limited by means of a stop plate 310, adjustably secured to the valve body 218 as at 312, the stop plate 310 having a slot 314 formed in the upper end thereof slidably engageable with a shoulder 316 formed on the lock bolt 308 as best shown on FIGS. 2 and 8.

Obviously many modifications and variations of the present invention are possible in the light of the above teachings. It is therefore to be understood that within the scope of the appended claims the invention may be practiced otherwise than as specifically described.

What is claimed is:

1. A pressure responsive counter valve of the character described comprising a casing movable from an initial position to an operating position, a source of fluid pressure in communication with said casing, movable means disposed within said casing and movable in one direction in response to said pressure for admitting said pressure into the casing, means disposed within said casing for moving the casing from said initial position to said operating position when said pressure within said casing has reached a predetermined value, means in engagement with said movable means for moving the movable means in a reverse direction when said pressure ceases to flow into said casing, port means in said casing for reducing said pressure within the casing as said movable means is moved in said reverse direction and the pressure is exhausted through said port means, means disposed within said casing for moving the casing from said operating position to said initial position when the pressure has been reduced, and means including an adjustable cam for maintaining a constant flow of pressure through said casing when the casing is in said operating position.

2. A pressure actuated counter valve of the character described comprising a casing movable from an initial position to an operating position, supporting means for movably supporting said casing, a source of fluid pressure in communication with said casing, movable means disposed within said casing and movable in one direction in response to pressure for admitting pressure into said casing, piston means fixed at one end to said supporting means with the other end thereof slidably disposed with the casing for moving the casing from said initial position to said operating position when said pressure within the casing has reached a predetermined value, a resilient member in engagement with the movable means for moving said movable means in a reverse direction when said pressure ceases to flow into said casing, port means in said casing for reducing said pressure within said casing as said movable means is moved in said reverse direction and the pressure is exhausted through said port means, means in engagement with said piston and with the casing for moving the casing from said operating position to said initial position when the pressure has been reduced, means including an adjustable cam for maintaining a constant pressure through said casing when the casing is in said operating position, means for adjusting said cam to a preselected position, and means for locking said cam in said preselected position.

3. A pressure responsive counter valve of the character described comprising a casing movable from an initial position to an operating position, a source of fluid pressure in communication with said casing, movable means disposed within said casing and movable in one direction in response to said pressure for admitting said pressure into the casing, means disposed within said casing for moving the casing from said initial position to said operating position when said pressure within said casing has reached a predetermined value, means in engagement with said movable means for moving the movable means in a reverse direction when said pressure ceases to flow into said casing, port means in said casing for reducing said pressure within the casing as said movable means is moved in said reverse direction and the pressure is exhausted through said port means, means disposed within said casing for moving the casing from said operating position to said initial position when the pressure has been reduced, an adjustable cam movably mounted at one end of the casing, a ball check disposed within the casing for maintaining a constant flow of pressure through said casing when the casing is in said operating position, means carried by said adjustable cam in engagement with said ball check for maintaining the ball check in an open position when the casing is in said operating position, and means disposed within the casing in engagement with the ball check for closing the ball check when the casing has been moved from said operating position to said initial position.

4. A pressure responsive counter valve of the character described comprising a casing movable from an initial position to an operating position, a source of fluid pressure in communication with said casing, movable means disposed within said casing and movable in one direction in response to said pressure for admitting said pressure into the casing, means disposed within said casing for moving the casing from said initial position to said operating position when said pressure within said casing has reached a predetermined value, means in engagement with said movable means for moving the movable means in a reverse direction when said pressure ceases to flow into said casing, port means in said casing for reducing said pressure within the casing as said movable means is moved in said reverse direction and the pressure is exhausted through said port means, means disposed within said casing for moving the casing from said operating position to said initial position when the pressure has been reduced, a ball check disposed within said casing for maintaining a constant flow of pressure through the casing when the casing is in said operating position, a plunger reciprocable in the casing in engagement at one end thereof with said ball check, and a variable cam mounted on the other end of the plunger and movable therewith an amount sufficiently to maintain the ball check in said open position when the casing is in said operating position.

5. A pressure actuated counter valve of the character described comprising a casing movable from an initial position to an operating position, supporting means for movably supporting said casing, a source of fluid pressure in communication with said casing, movable means disposed within said casing and movable in one direction in response to pressure for admitting pressure into said casing, piston means fixed at one end to said supporting means with the other end thereof slidably disposed with the casing for moving the casing from said initial position to said operating position when said pressure within the casing has reached a predetermined value, a resilient member in engagement with the movable means for moving said movable means in a reverse direction when said pressure ceases to flow into said casing, port means in said casing for reducing said pressure within said casing as said movable means is moved in said reverse direction and the pressure is exhausted through said port means, means in engagement with said piston and the casing for moving the casing from said operating position to said initial position when the pressure has been reduced, means including an adjustable cam for maintaining a constant flow of pressure through the casing when the casing is in said operating position, means for adjusting said cam to a preselected position, means for locking said cam in said preselected position, a first conical portion and a flexible portion on said movable means in sealing engagement with said casing and unsealed therefrom by said pressure as the movable means is moved in said one direction, and a second conical portion on the movable means and normally out of sealing engagement with the casing and movable into engagement therewith as said first conical portion and the flexible portion are unsealed from the casing.

6. A pressure responsive valve comprising a casing movable from an initial position to an operating position, pressure actuated means for admitting fluid under pressure into said casing, additional pressure actuated means for moving the casing from said initial position to said operating position, normally closed means disposed within said casing and movable to an open position when the casing moves to said operating position, cam actuated means in engagement with said normally closed means for moving the normally closed means to said open position, and means for maintaining a constant flow of pressure through the casing when the casing is in said operating position and the normally closed means in said open position.

7. A pressure responsive valve comprising a casing movable from an initial position to an operating position, pressure actuated means for admitting fluid under pressure into said casing as the pressure actuated means is moved in one direction, additional pressure actuated means for moving the casing from said initial position to said operating position, means on said pressure actuated means for interrupting the flow of fluid into said casing as the pressure actuated means is moved in a reverse direction into sealing engagement with the casing, exhaust means in said casing for porting the fluid therefrom as the pressure actuated means moves into sealing engagement with the casing, means for maintaining a constant flow of fluid through said casing when the casing is in said operating position, and means in engagement with said additional pressure actuated means and the casing for moving the casing from said operating position to said initial position when the fluid is ported from the casing.

8. A pressure actuated valve comprising a casing movable from an initial position to an operating position, pressure actuated means for admitting fluid under pressure into said casing, additional pressure actuated means for moving the casing from said initial position to said operating position, a normally closed ball check disposed within the casing and movable to an open position as the casing moves to said operating position, cam means including a plunger for moving said ball check from said closed position to said open position, and means for maintaining a constant flow of fluid through said casing when the casing is in the operating position and the ball check is in said open position.

References Cited in the file of this patent

UNITED STATES PATENTS

| | | |
|---|---|---|
| 2,132,953 | Indge | Oct. 11, 1938 |
| 2,535,957 | Romaine et al. | Nov. 26, 1950 |
| 2,882,930 | Lee | Apr. 21, 1959 |
| 2,889,754 | Lee | June 9, 1959 |
| 2,897,790 | Lee | Aug. 4, 1959 |
| 2,908,252 | Schuman | Oct. 13, 1959 |